US011390352B2

(12) United States Patent
Raffaelli (10) Patent No.: US 11,390,352 B2
(45) Date of Patent: Jul. 19, 2022

(54) MOTORCYCLE WITH TWO FRONT STEERING WHEELS AND A STEERING HANDLEBAR WITH VARIABLE STEERING RATIO

(71) Applicant: PIAGGIO & C. S.p.A., Pisa (IT)

(72) Inventor: Andrea Raffaelli, Pisa (IT)

(73) Assignee: PIAGGIO & C. S.P.A., Pisa (IT)

( * ) Notice: Subject to any disclaimer, the term of this patent is extended or adjusted under 35 U.S.C. 154(b) by 287 days.

(21) Appl. No.: 16/465,159

(22) PCT Filed: Dec. 5, 2017

(86) PCT No.: PCT/IB2017/057653
§ 371 (c)(1),
(2) Date: May 30, 2019

(87) PCT Pub. No.: WO2018/104862
PCT Pub. Date: Jun. 14, 2018

(65) Prior Publication Data
US 2020/0180724 A1    Jun. 11, 2020

(30) Foreign Application Priority Data
Dec. 5, 2016 (IT) .......................... 102016000123275

(51) Int. Cl.
*B62K 21/18* (2006.01)
*B62K 5/027* (2013.01)
(Continued)

(52) U.S. Cl.
CPC .............. *B62K 21/18* (2013.01); *B62K 5/027* (2013.01); *B62K 5/05* (2013.01); *B62K 19/32* (2013.01); *B62K 21/12* (2013.01)

(58) Field of Classification Search
CPC .......... B62K 21/18; B62K 5/027; B62K 5/05; B62K 19/32; B62K 21/12; B62K 21/00; B62K 5/08; B62K 5/10; B62K 5/00
See application file for complete search history.

(56) References Cited

U.S. PATENT DOCUMENTS 7,708,291 B1    5/2010   Henderson
10,086,900 B2 * 10/2018  Hara ...................... B62K 5/027
(Continued)

FOREIGN PATENT DOCUMENTS

CN     104520178 A    4/2015
EP     1199244 A1     4/2002
(Continued)

OTHER PUBLICATIONS

International Search Report and Written Opinion for corresponding application PCT/IB2017/057653 filed Dec. 5, 2017; dated Mar. 15, 2018.
(Continued)

*Primary Examiner* — Kevin Hurley
*Assistant Examiner* — Marlon A Arce
(74) *Attorney, Agent, or Firm* — Cantor Colburn LLP (57) ABSTRACT

Motorcycle including at least one rear wheel, at least two front steering wheels, a handlebar, the front wheels being rotatable about respective lateral steering axes, according to lateral steering angles; the handlebar being rotatable according to a central steering angle about a central steering axis, the front wheels being kinematically connected to the steering handlebar by transmission means that realize a transmission ratio defined by the ratio between the lateral steering angles and the central steering angle, where the transmission means has a steering bar, kinematically connected to the handlebar, which directly links the front wheels together, wherein the transmission ratio between the front wheels and
(Continued)

the steering handlebar is variable as the central steering angle of the handlebar varies.

14 Claims, 7 Drawing Sheets

(51) Int. Cl.
  *B62K 5/05* (2013.01)
  *B62K 19/32* (2006.01)
  *B62K 21/12* (2006.01)

(56) References Cited

U.S. PATENT DOCUMENTS

| | | | | |
|---|---|---|---|---|
| 10,829,177 | B2 * | 11/2020 | Raffaelli | B60G 21/05 |
| 2004/0032120 | A1 | 2/2004 | Vaisanen | |
| 2005/0012291 | A1 * | 1/2005 | Bagnoli | B62K 5/08 |
| | | | | 280/124.103 |
| 2005/0167174 | A1 * | 8/2005 | Marcacci | B62K 5/08 |
| | | | | 180/76 |
| 2007/0262549 | A1 * | 11/2007 | Haerr | B62K 5/027 |
| | | | | 280/124.103 |
| 2008/0115994 | A1 * | 5/2008 | Martini | B62K 5/01 |
| | | | | 180/210 |
| 2008/0197597 | A1 * | 8/2008 | Moulene | B62D 21/183 |
| | | | | 280/124.103 |
| 2008/0238005 | A1 * | 10/2008 | James | B62K 5/10 |
| | | | | 280/5.509 |
| 2010/0044977 | A1 * | 2/2010 | Hughes | B60G 21/007 |
| | | | | 280/5.509 |
| 2015/0183484 | A1 | 7/2015 | Aillet | |
| 2015/0239522 | A1 * | 8/2015 | Iizuka | B62K 5/05 |
| | | | | 280/267 |
| 2015/0246704 | A1 * | 9/2015 | Takano | B60G 3/01 |
| | | | | 280/269 |
| 2015/0329164 | A1 | 11/2015 | De Winter | |
| 2017/0106930 | A1 * | 4/2017 | Hara | B62K 5/027 |

FOREIGN PATENT DOCUMENTS

| | | | |
|---|---|---|---|
| EP | 2836447 | A1 | 8/2003 |
| EP | 1391374 | A1 | 2/2004 |
| EP | 1923303 | A1 | 5/2008 |
| EP | 2404817 | A1 | 1/2012 |
| EP | 3056418 | A1 | 8/2016 |
| FR | 2836447 | * | 8/2003 |
| FR | 2836447 | A1 | 8/2003 |
| JP | 5871283 | A | 4/1983 |
| JP | 2002096788 | A | 4/2002 |
| JP | 2002127981 | A | 5/2002 |
| JP | 2009241874 | A | 10/2009 |
| JP | 2010052624 | A | 3/2010 |
| KR | 100931524 | B1 | 12/2009 |

OTHER PUBLICATIONS

EPO Submission for corresponding application 17817897.6; Dated Jan. 22, 2020.

Written Opinion of the International Searching Authority for corresponding application PCT/IB2017/057653; Report dated Mar. 15, 2018.

Japanese Search Report for corresponding application 2019-527822; Report dated May 25, 2021.

* cited by examiner

MOTORCYCLE WITH TWO FRONT STEERING WHEELS AND A STEERING HANDLEBAR WITH VARIABLE STEERING RATIO

FIELD OF APPLICATION

The present invention relates to a motorcycle with two front steering wheels and a steering handlebar with variable steering ratio.

BACKGROUND ART

As is known, the steering ratio is the ratio of the motorcycle handlebar rotation and the front steering wheel rotation.

In the case of unitary steering ratio, there is a direct link between the handlebar and the wheels which rotate always mutually jointly with the same angle of the handlebar.

If on the one hand a unitary steering ratio guarantees a direct and immediate steering, and thus a considerable responsiveness of the motorcycle to the driver's manoeuvres, on the other hand it often causes a handlebar that is hard and heavy to be rotated, especially maneuvers at low travelling speed.

It is equally true that while a down-steering ratio, i.e. such that the steering angle of the wheels is significantly less than the angle of rotation of the handlebar, greatly eases the effort on the handlebar by the user, the other hand it requires a considerable rotation of the same handlebar to carry out a reduced wheel steering.

This leads to a poor responsiveness of the handlebar but also some discomfort in operating the same, as well as the need to predict changes to the fairings of the vehicle to prevent the handlebar from interfering with the fairings themselves, upon achieving the steering travel end.

Therefore, the problem arises of how to set up an effort on the handlebar that varies with the extent of the rotation or steering angle to be imparted to the handlebar itself.

For example, it is possible to impose a handlebar up-steered around zero (that is, around the position with straight wheels and handlebar), then harder to operate but capable of making the vehicle more responsive, or—on the contrary—a down-steering around zero to emphasize the driving lightness.

The problem of the operating hardness of the handlebar is even more emphasized in the case of motorcycle with two front steering wheels: it is clear that, in this type of vehicle, the front axle is more loaded than a motorcycle with a single front steering wheel. In addition, a front axle with two steering wheels also doubles the frictional forces exchanged between the tyres and the ground, which contribute to stiffening the handlebar, especially when the vehicle is stationary or at low speeds.

DISCLOSURE OF THE INVENTION

In order to solve the problems mentioned above, to date some solutions have been adopted in the art.

For example, the down-steering is well known and used in cars (the steering wheel makes about 3 full turns to give a 45° steering of the wheels). In order to achieve such a down-steering, the angle of rotation of the handlebar must be greater than the steering angle of the wheels so as to reduce the effort required by the driver's arms. Depending on the steering transmission system adopted, such a ratio can be changed at any point of the motion transmission chain. It is clear that, in the case of motor vehicles, the possibilities of solving the technical problems are much greater, since servomechanisms, either electric and/or hydraulic, are now extensively used that solve the problem of excessive operating force of the steering wheel by the driver; moreover, in motor vehicles the problem of overall dimensions and interference of the steering wheels is more easily solved, having more space available.

In the case of motorcycles, servomechanisms are not used as they would excessively increase the weight and cost of the vehicle, and it is also necessary to minimise the dimensions of steering devices.

In fact, for example, excessive rotation of the handlebar, resulting from a considerable down-steering aimed at reducing the steering effort, involves the risk of interference between parts of the handlebar and parts of the chassis and/or fairings of the motorcycle.

Such prior art solutions, used in the automotive sector, therefore imply the above drawbacks. The need of solving the drawbacks and limitations mentioned with reference to the prior art is therefore felt.

Such a need is met by a motorcycle according to claim 1.

DESCRIPTION OF THE DRAWINGS

Further features and advantages of the present invention will appear more clearly from the following description of preferred non-limiting embodiments thereof, in which:

FIG. 2 shows a front view of the motorcycle in FIG. 1a from the side of arrow II in FIG. 1a;

Elements or parts of elements in common o the embodiments described below are referred to with the same reference numerals.

DETAILED DESCRIPTION

With reference to the above figures, reference numeral 4 globally indicates an overall view of a motorcycle according to the present invention.

Motorcycle 4 comprises at least one rear wheel and at least two front steering wheels 12, 16 kinematically linked to a handlebar 20.

The motorcycle comprises a chassis 24 which supports a front axle 26 comprising the front steering wheels 12, 16 and a rear axle 28 comprising a rear swingarm 30 supporting the rear wheel 8.

Both the rear swingarm 30 and chassis 24 may have any shape, size and may for example be of the lattice type, the box-like type, die-cast, and so on.

Chassis 24 may be in one piece or in multiple parts; typically, the portion of chassis 24 that interfaces with swingarm 30 supports the driver and/or passenger seat. Swingarm 30 may be hinged to said portion of chassis 24 of motorcycle 4 with respect to at least one hinge pin. It should be noted that the connection between swingarm 30 and chassis 24 may be direct, through direct hinging, or it may also be by the interposition of crank mechanisms and/or intermediate frames.

As regards the front axle 26, the front steering wheels 12, 16 are rotatable about respective lateral steering axes L1 and L2, according to lateral steering angles $\alpha 1$, $\alpha 2$; handlebar 20 is in turn rotatable according to a central steering angle $\beta$ about a central steering axis C. The front steering wheels 12, 16 are kinematically connected to the handlebar 20 by transmission means 36 that realise a transmission ratio T defined by the ratio between the lateral steering angles $\alpha 1$, $\alpha 2$ and the central steering angle $\beta$.

Advantageously, the transmission means 36 comprise a steering bar 40, kinematically connected to handlebar 20, which directly links the front steering wheels 12, 16.

Advantageously, the transmission ratio T between the front steering wheels 12, 16 and handlebar 20 is variable as the central steering angle $\beta$ of handlebar 20 varies.

According to an embodiment, said transmission ratio T is maximum in proximity of a central position of handlebar 20, for a null central steering angle $\beta$, and decreases as the rotation of handlebar 20 increases with respect to said central position.

According to a possible embodiment, said transmission ratio T is substantially unitary in correspondence of a central steering angle $\beta$ greater than 40 degrees.

According to an embodiment, the transmission means 36 comprise two lateral steering supports 44, 48, each kinematically connected to a corresponding front wheel 12, 16, wherein which the steering bar 40 is pivoted to said lateral steering supports 44, 48 in correspondence of respective lateral hinges 52, 56, wherein the steering bar 40, in correspondence with a centreline M, comprises a central hinge 60 through which it is pivoted by means of a central kinematic mechanism 62 to a steering tube 64 rotatably connected to handlebar 20.

The lateral steering supports 44, 48 define lateral steering arms 68, 70 equal to each other, wherein the steering bar 40 is shaped so as to intercept a central steering arm 72 having less length with respect to the lateral steering arms 68, 70.

The lateral steering arms 68, 70 are the distance between each lateral steering axis L1, L2 and the corresponding lateral hinge 52, 56, while the central steering arm 72 is the distance between the central hinge 60 and the central steering axis C.

Preferably, in a configuration with straight front steering wheel, 12, 16, the lateral steering arms 68, 70 are greater than the central steering arm 72.

This allows achieving the condition whereby the transmission ratio T is maximum in proximity of a central position of handlebar 20, for a null central steering angle $\beta$, and decreases as the rotation of handlebar 20 increases with respect to said central position.

Preferably, the central kinematic mechanism 62 is shaped so as to vary the length of the central steering arm 72 as the central steering angle $\beta$ varies.

According to an embodiment, the central kinematic mechanism 62 comprises means of varying the length 76 of the central steering arm 72, so as to adapt the length of the central steering arm 72 to the actual and contingent central steering angle $\beta$.

Figure 1A:
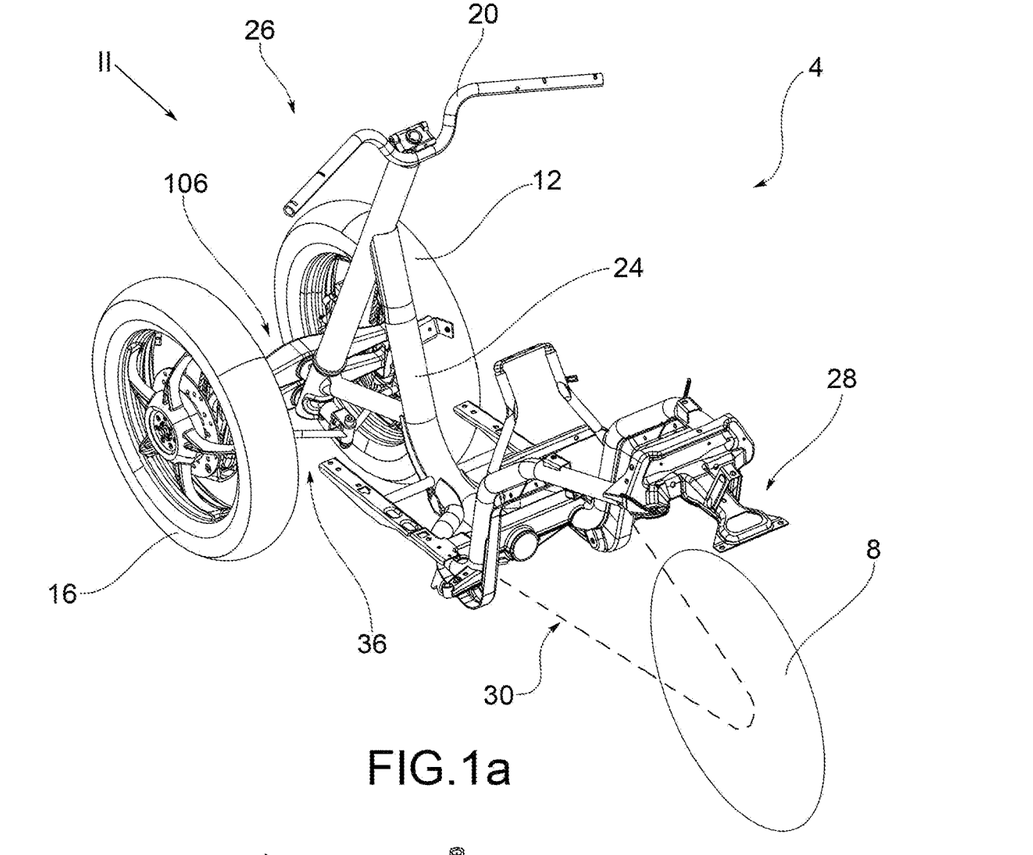
FIG. 1a shows a perspective view of a motorcycle according to an embodiment of the present invention.
Figure 1B:
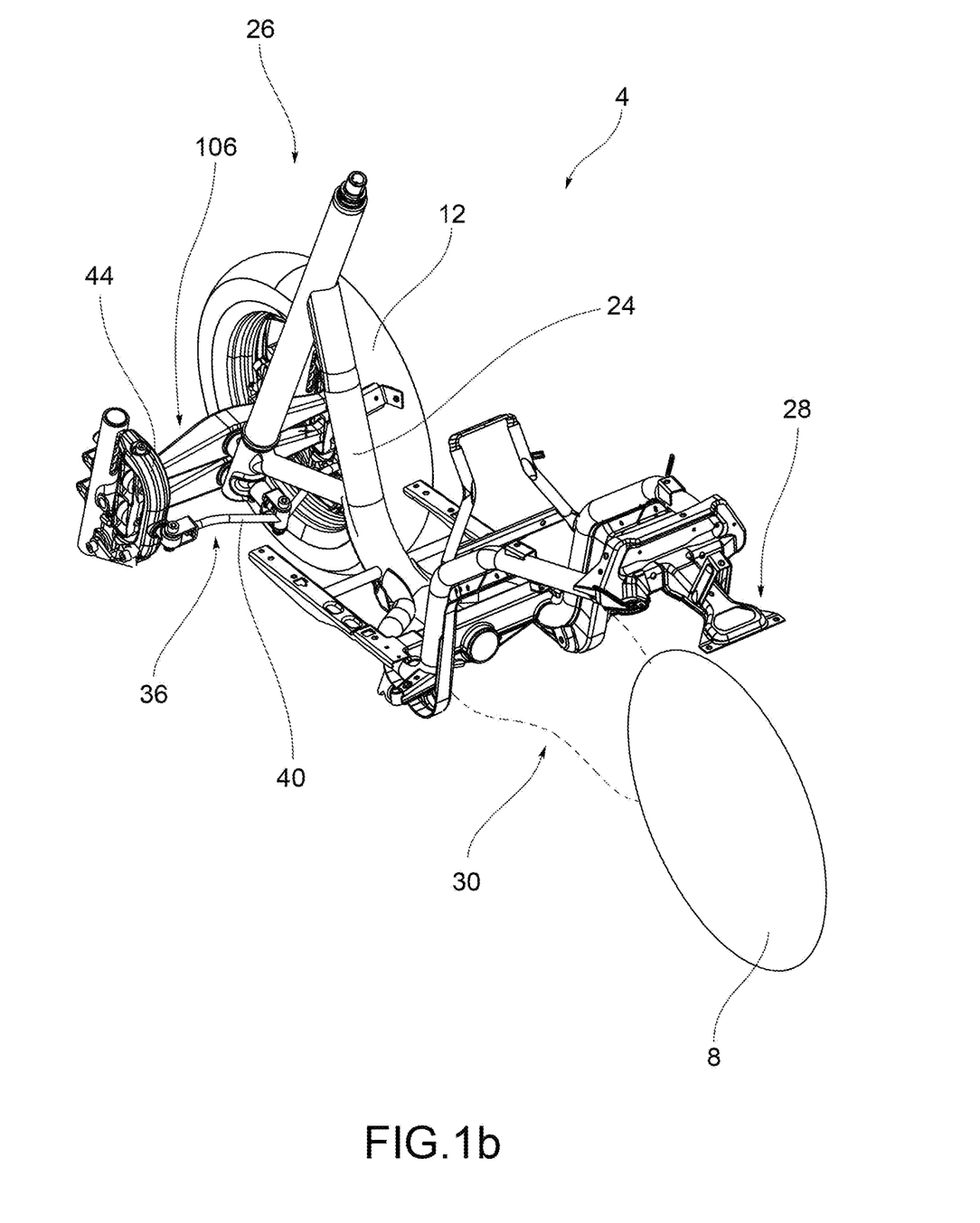
FIG. 1b shows a perspective view of the motorcycle in FIG. 1a, where the handlebar and a front wheel have been omitted for a better view of some components of the motorcycle.
Figure 2:
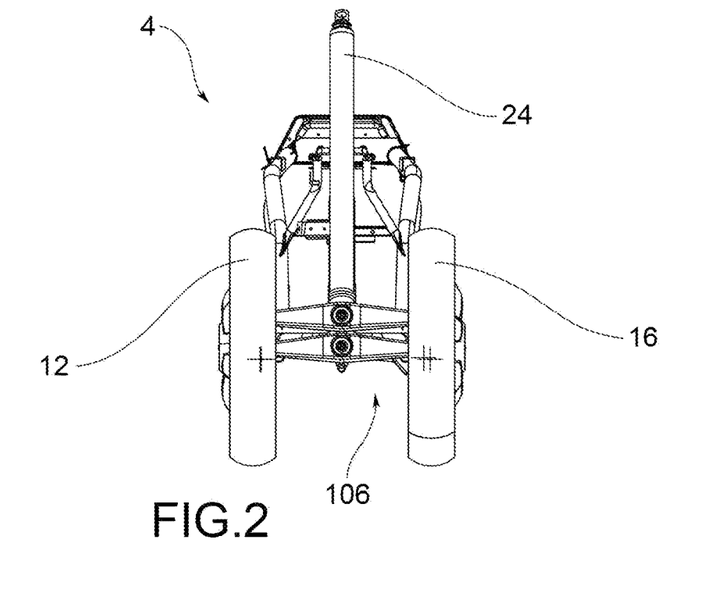
Figure 3:
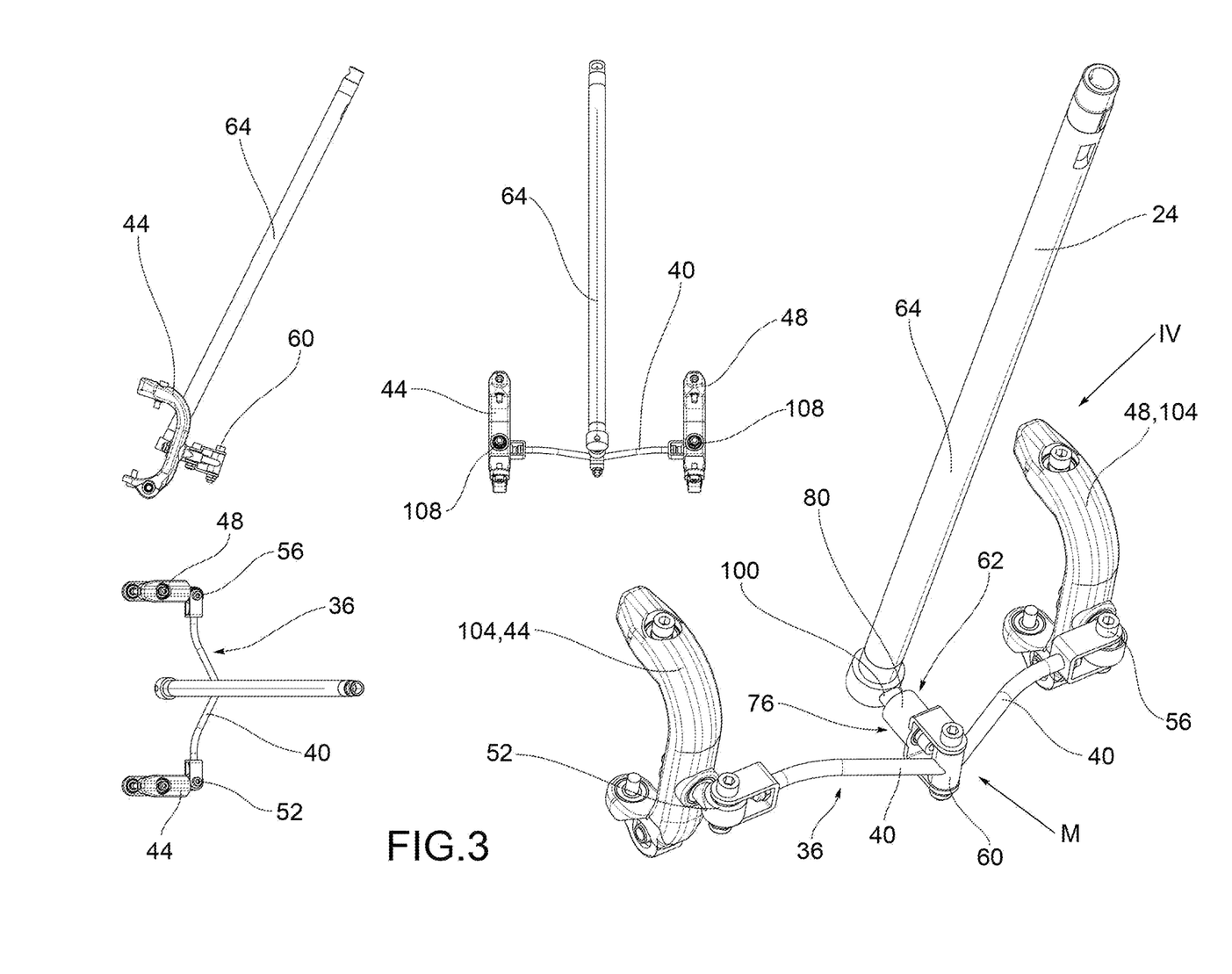
FIG. 3 shows various perspective and lateral views of the front axle of a motorcycle according to an embodiment of the present invention.
Figure 4:
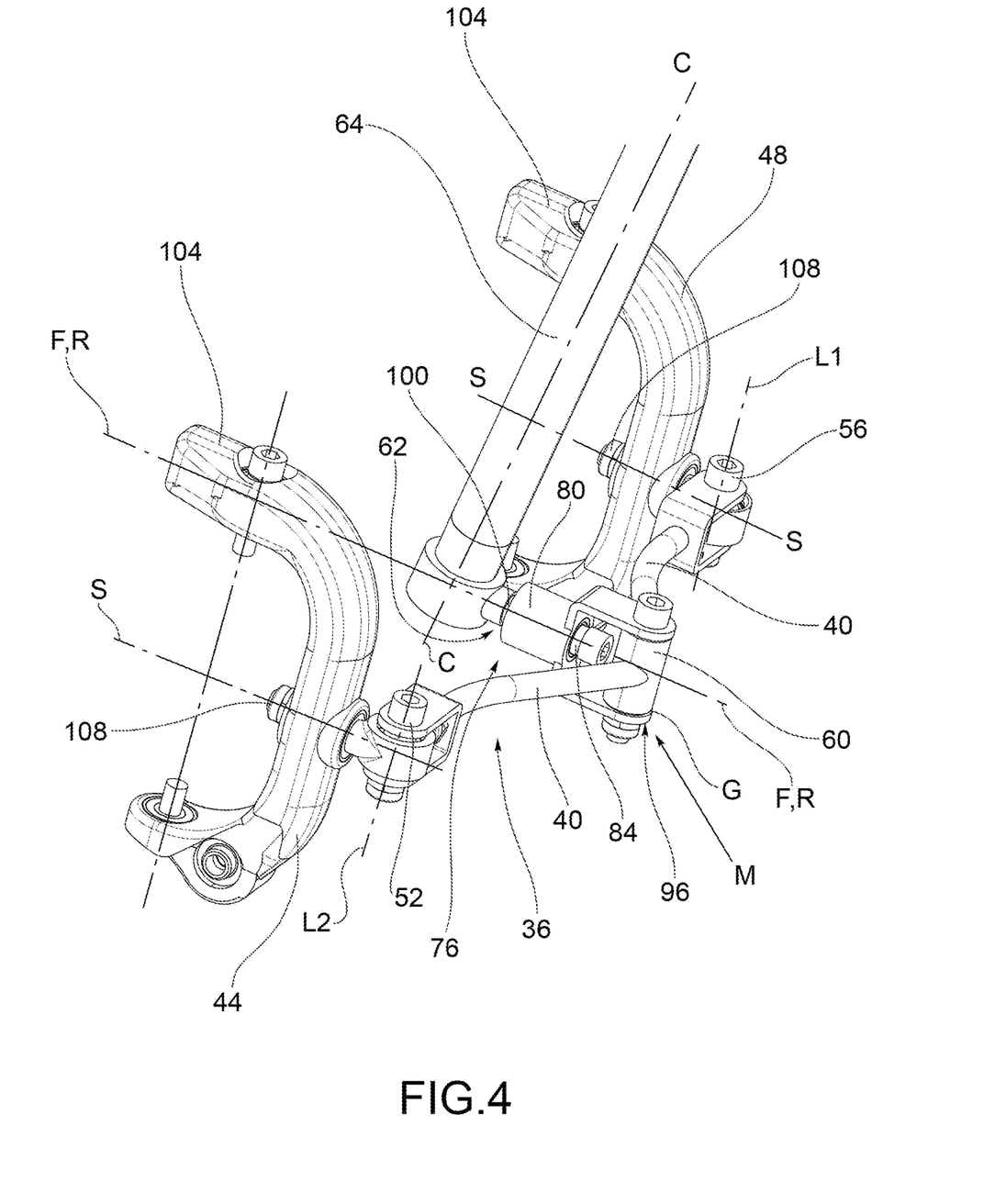
FIG. 4 shows an enlarged perspective view of detail IV in FIG. 3.

For example, the means of varying the length 76 of the central steering arm 72 may comprise a longitudinal bushing 80 slidable on a stem 84 along a longitudinal direction F, parallel to said central steering arm 72 (FIG. 4).

Figure 5:
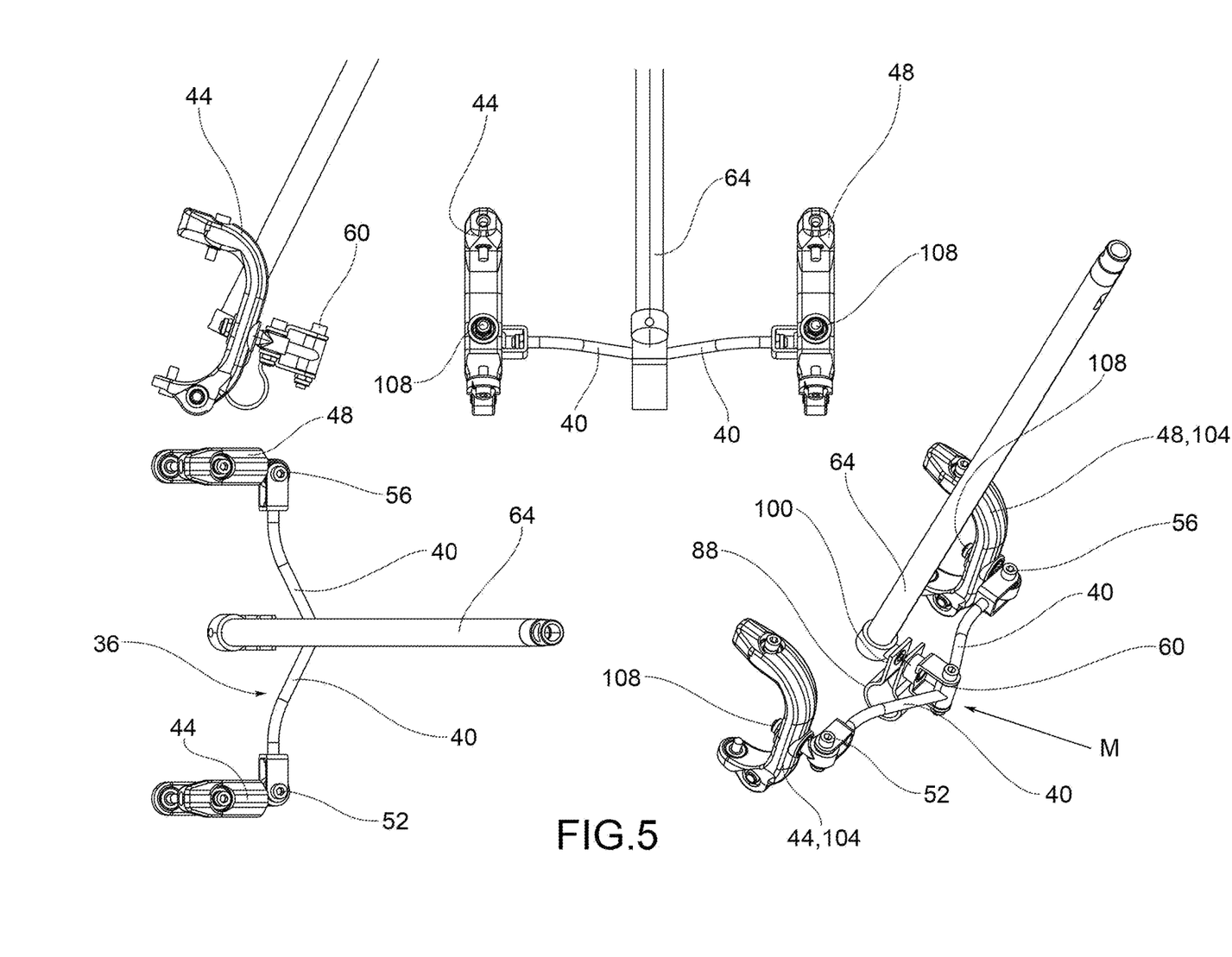
FIG. 5 shows various perspective and lateral views of the front axle of a motorcycle according to a further embodiment of the present invention.
Figure 6:
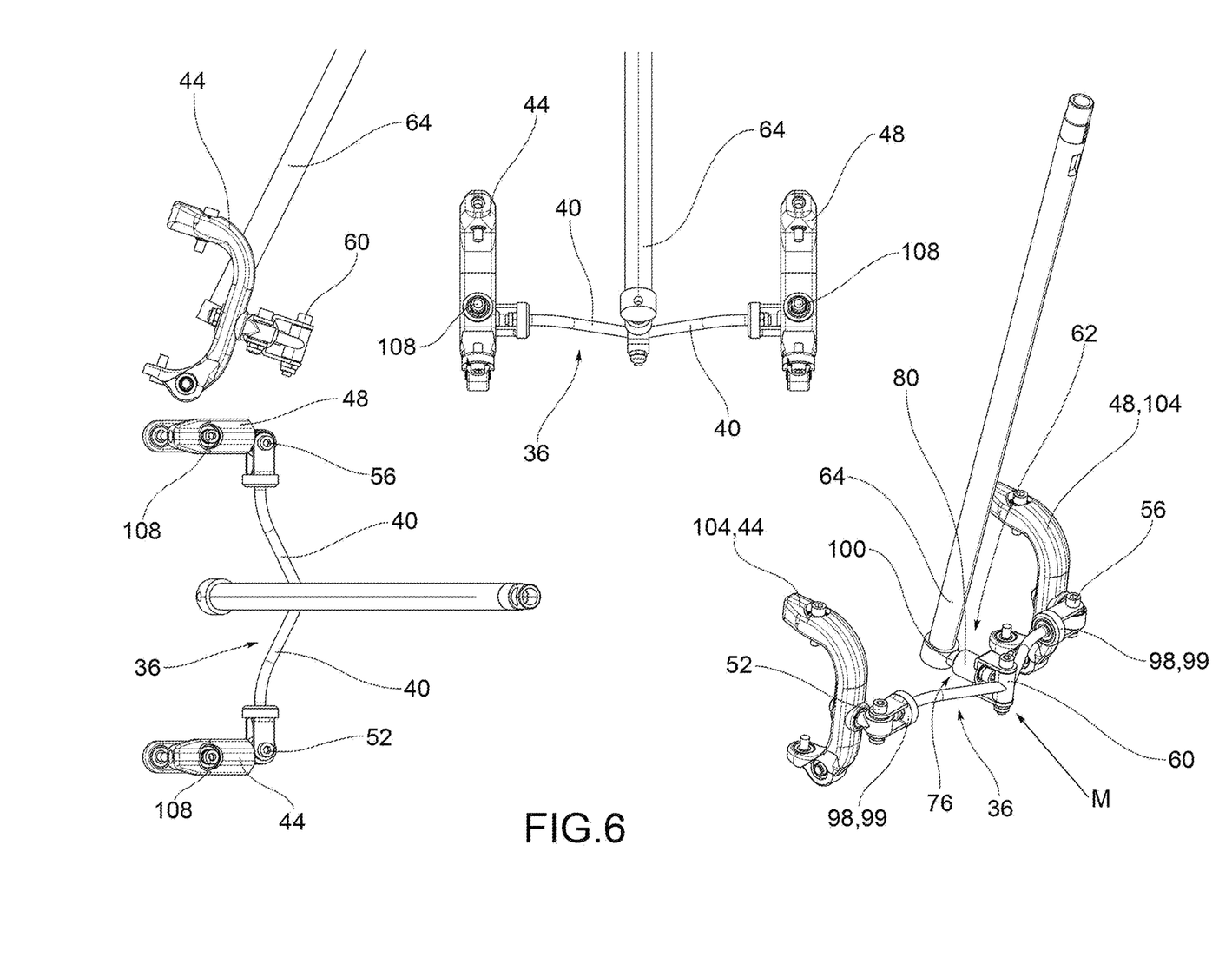
FIG. 6 shows various perspective and lateral views of the front axle of a motorcycle according to a further embodiment of the present invention.

According to a further possible embodiment (FIG. 5), the means of varying the length 76 of the central steering arm 72 comprise elastic means 88, elastically deformable along a longitudinal direction F, parallel to said central steering arm 72, so as to allow a lengthening and/or shortening of the length of the central steering arm 72 as a function of the rotation of handlebar 20.

According to a further possible embodiment, the means of varying the length 76 of the central steering arm 72 comprise active means (not shown), with hydraulic, mechanical and/or electric actuation to selectively modify the length of the central steering arm 72 along a longitudinal direction F, parallel to said central steering arm 72, as a function of the rotation of the central steering arm 72.

According to a possible embodiment, the means of varying the length 76 of the central steering arm 72 comprise a locking device (not shown), suitable to selectively fix the length of the central arm 72 at any desired value. In this way, it is possible to realise the function of steering lock in any position or rotation of handlebar 20.

According to an embodiment, the lateral steering axes L1, L2 are parallel to each other but have a different inclination with respect to the central steering axis C; in such a configuration, the central kinematic mechanism 62 may comprise floating means 96 suitable to allow a translation of the central steering arm 72 according to a vertical direction, orthogonal to the central steering arm 72 itself. For example, such a translation may be obtained by providing a vertical clearance G between steering bar 40 and the respective central hinge 60.

According to a possible embodiment (FIG. 5), wherein the lateral steering axes L1, L2 are parallel to each other but have a different inclination with respect to the central steering axis C, the steering bar 40 may be provided with rotation junctions 98, for example in proximity of connection ends thereof to said lateral steering supports 44, 48; for example, said rotation junctions 98 comprise ball bearings 99.

According to an embodiment, the central kinematic mechanism 62 comprises a longitudinal hinge 100, which defines a longitudinal rotation axis R parallel to the central steering arm 72 so as to allow the rotation of the steering bar 40 about said longitudinal rotation axis R. This embodiment allows the steering bar 40 to follow the rolling movements of a tilting front axle.

In particular, said front steering wheels 12, 16 are supported by support brackets 104 kinematically connected to a transverse quadrilateral structure 106 that supports handlebar 20, the quadrilateral structure 106 defining rolling hinges 108 parallel to each other, according to a rolling direction S-S.

Preferably, the steering bar 40 is pivoted to said support brackets 104 by means of lateral rolling hinges 108 parallel to said rolling direction S-S.

Preferably, the longitudinal rotation axis R is parallel to said rolling direction S-S.

The operation in particular of the front axle of the motorcycle according to the present invention shall now be described.

Figure 7:
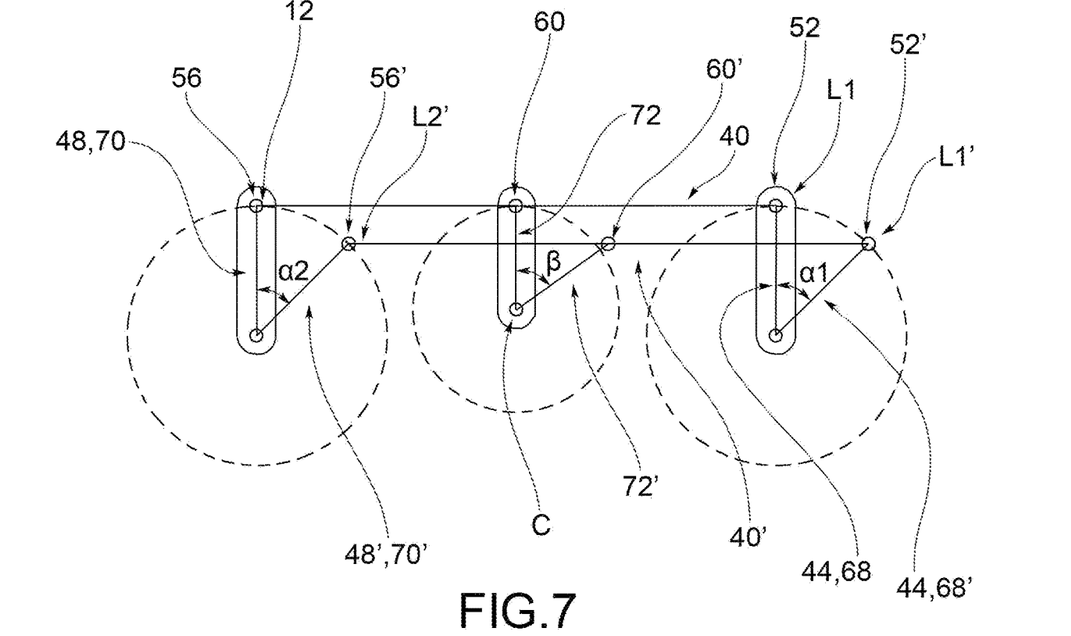
FIG. 7 shows a schematic plan view of the operating kinematics of the front axle steering of a motorcycle according to the present invention.

In particular, FIG. 7 schematically shows the operation of the kinematic mechanisms of the motorcycle front axle according to the present invention.

The user acts on handlebars 20 to rotate the steering bar 40 and in particular the central steering arm 72. Let us assume to start from the condition of handlebar with straight wheels. The length of the central Steering arm 72 is less than the length of the lateral steering arms 68, 70. Due to the presence of the means of varying the length 76 of the central steering arm 72, the kinematic mechanism is not hyperstatic but it is able to allow steering; thus, with increasing steering angle of handlebar 20, the central steering arm 72 extends. Likewise, the transmission ratio T between the lateral steering angles α1, α2 and the central steering angle β varies. In particular, such a transmission ratio T progressively decreases: in this way, the handlebar is very 'light' at first, as it is down-steered, to then become harder as the steering angle increases.

The steering condition is shown in FIG. 7 by subscripts "'" in relation to all elements that are rotated or roto-translated as a result of the rotation of handlebar 20.

Figure 8:
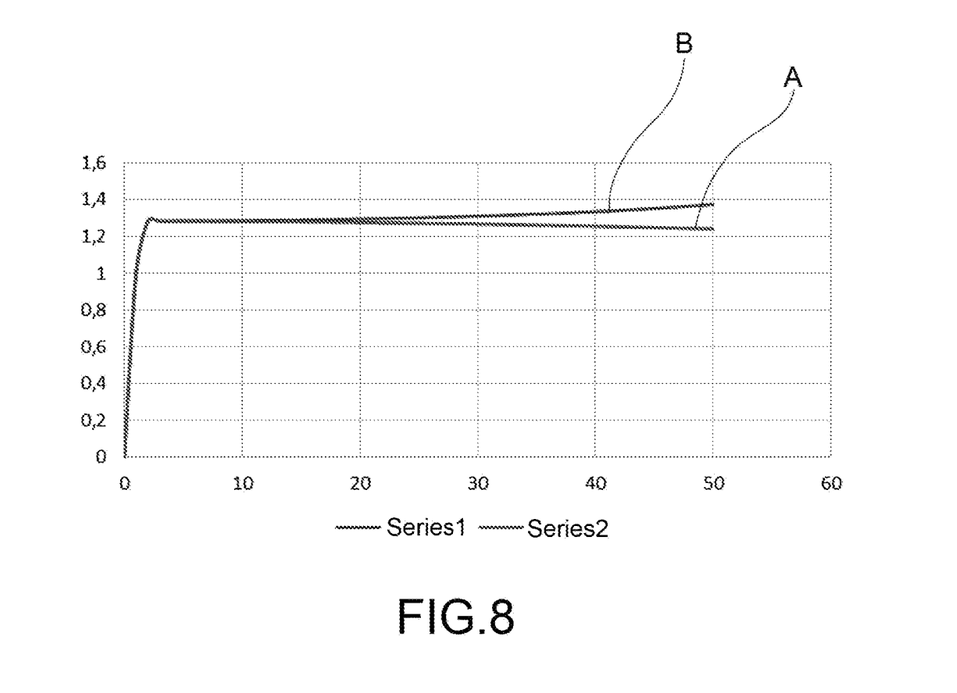
FIG. 8 shows a diagram of the pattern of the transmission ratio T between the side steering angles and the central steering angle, as a function of the steering angle imposed through the handlebar.

In FIG. 8, the abscissa shows the steering angle red on handlebar 20 (thus the central steering angle β), while the ordinate shows the ratio between the average steering between the front wheels 12, 16 (i.e. an average value between the lateral steering angles α1, α2 and the central steering angle β of handlebar 20: in the absence of down-steering and kinematic steering, the wheels would both steer by the same angle as handlebar 20 and the ratio would constantly be unitary.

Curve B shows the situation with fixed down-steering ratio, while curve A shows the pattern of a solution according to the present invention, with variable down-steering. The different trend is evident: as the central steering angle β at handlebar 20 increases, with fixed steering wheel (curve B) the ratio deviates from 1, whereas with the variable transmission ratio T (curve A), it approaches the unitary value. This discrepancy between the two behaviours increases as the central steering angle β increases.

As can be appreciated from the description, the present invention allows overcoming the drawbacks of the prior art.

In particular, among all the ways to change the steering ratio, the present invention proposes a kinematic mechanism which makes it closer to the unit (and thus stiffening it if soft around zero, or with straight wheels, and vice versa).

In particular, this is important in case of down-steering to avoid rotating the handlebar too much during a u-turn, which could be ergonomically unfavourable and impose constraints to the vehicle coatings/fairings.

Operationally, it was found that the driver experiences a significant improvement in the perceived agility of the motorcycle with down-steering which reduces the effort on the handlebar with equal angle of rotation of the wheel.

The present invention therefore allows varying the steering ratio of the handlebar automatically and efficiently, without expensive and complex mechanisms to be implemented.

This also prevents weighing down the front axle of the motorcycle.

The variable down-steering can also lighten the handlebar near the zero, to then tend to a steering ratio close to the unit as the steering angle increases.

In this way close to zero, that is, with the wheels substantially straight, a lightening of the steering wheel is obtained which makes driving more comfortable, without requiring excess effort on the handlebar.

Moreover, when the angle of the handlebar is significantly increased with respect to the central position, the variation in the steering ratio decreases the down-steering, almost to the direct ratio, so as to avoid interference between the handlebar and parts of the chassis and/or hull of the vehicle.

In other words, with the present invention, a variable steering ratio is achieved which allows having the advantages of down-steering in terms of comfort, avoiding the drawbacks thereof in terms of size.

Also, as the steering angle increases, the same stiffens, since the down-steering is automatically reduced. In this way, the steering sensitivity and stiffness increase when one needs them most, that is, when dealing with a curve.

The motorcycle according to the present invention ensures comfort and driving precision, without raising costs, weights and overall dimensions of the steering device.

A man skilled in the art may make several changes and adjustments to the devices described above in order to meet specific and incidental needs, all falling within the scope of protection defined in the following claims.

The invention claimed is:

1. Motorcycle comprising:
   at least one rear wheel
   at least two front steering wheels,
   a handlebar,
   the front wheels being rotatable about respective lateral steering axes, according to lateral steering angles, the handlebar being rotatable according to a central steering angle about a central steering axis,
   the front wheels being connected to the steering handlebar by transmission means that realize a transmission ratio defined by a ratio between the lateral steering angles and the central steering angle,
   wherein the transmission means comprise a steering bar, connected to the handlebar by means of a central kinematic mechanism, the steering bar directly linking the front wheels together,
   wherein the transmission ratio between the front wheels and the steering handlebar is variable as the central steering angle of the handlebar varies,
   wherein the central kinematic mechanism is shaped so as to vary a length of a central steering arm as the central steering angle varies, and
   wherein said central kinematic mechanism comprises a longitudinal hinge, which defines a longitudinal rotation axis parallel to the central steering arm so as to allow the rotation of the steering bar about said longitudinal rotation axis.

2. Motorcycle according to claim 1, wherein said transmission ratio is maximum in proximity of a central position of the handlebar, for a null central steering angle, and decreases as the rotation of the handlebar increases with respect to said central position.

3. Motorcycle according to claim 1, wherein said transmission ratio is substantially unitary in correspondence of a central steering angle greater than 40 degrees.

4. Motorcycle according to claim 1, wherein said transmission means comprise two lateral steering supports, each connected to a corresponding front wheel, wherein which the steering bar is pivoted to said lateral steering supports in correspondence of lateral hinges, wherein the steering bar, in correspondence with a centerline, comprises a central hinge through which it is pivoted by means of a central kinematic mechanism to a steering tube rotatably connected to the handlebar.

5. Motorcycle according to claim 4, wherein the lateral steering supports define lateral steering arms equal to each other, wherein the steering bar is shaped so as to intercept said central steering arm having less length with respect to the lateral steering arms, said lateral steering arms being the distance between each lateral steering axis and the corresponding lateral hinge, said central steering arm being the distance between the central hinge and the central steering axis, wherein the lateral steering arms, and in the configuration with straight front steering wheels, are greater than the central steering arm.

6. Motorcycle according to claim 1, wherein said central kinematic mechanism comprises means suitable for varying the length of the central steering arm, so as to adapt the length of the central steering arm to the actual and contingent central steering angle.

7. Motorcycle according to claim 6, wherein said means of varying the length of the central steering arm comprise a longitudinal bushing slidable on a stem along a longitudinal direction, parallel to said central steering arm.

8. Motorcycle according to claim 6, wherein said means of varying the length of the central steering arm comprise elastic means, elastically deformable along a longitudinal direction, parallel to said central steering arm, so as to allow a lengthening and/or shortening of the length of the central steering arm as a function of the rotation of the handlebar.

9. Motorcycle according to claim 6, wherein said means of varying the length of the central steering arm comprise active means, with hydraulic, mechanical and/or electric actuation, of their combination to selectively modify the length of the central steering arm along a longitudinal direction, parallel to said central steering arm, as a function of the rotation of the central steering arm.

10. Motorcycle according to claim 6, wherein said means of varying the length of the central steering arm comprise a locking device, suitable to selectively fix the length of the central arm at any desired value.

11. Motorcycle according to claim 1, wherein the lateral steering axes are parallel to each other but have a different inclination with respect to the central steering axis, wherein the central kinematic mechanism comprises floating means suitable to allow a translation of the central steering arm according to a vertical direction, orthogonal to the central steering arm itself.

12. Motorcycle according to claim 1, wherein the lateral steering axes are parallel to each other but have a different inclination with respect to the central steering axis, wherein the steering bar is provided with rotation junctions in proximity of its connection ends to lateral steering supports, wherein said rotation junctions comprise ball bearings.

13. Motorcycle according to claim 1, wherein said front wheels are supported by support brackets, and wherein said support brackets are connected to a transverse quadrilateral structure that supports the handlebar, the quadrilateral structure defining rolling hinges parallel to each other, according to a rolling direction, wherein the steering bar is pivoted to said support brackets by means of lateral hinges parallel to said rolling direction.

14. Motorcycle according to claim 13, wherein the longitudinal rotation axis is parallel to said rolling direction.

\* \* \* \* \*